United States Patent
Yu et al.

(10) Patent No.: US 11,208,351 B2
(45) Date of Patent: Dec. 28, 2021

(54) ELECTROMAGNETICALLY-INDUCED CEMENT CONCRETE CRACK SELF-HEALING DIISOCYANATE MICROCAPSULES AND THEIR PREPARATION METHOD

(71) Applicant: WUHAN UNIVERSITY OF TECHNOLOGY, Hubei (CN)

(72) Inventors: Jianying Yu, Hubei (CN); Wei Du, Hubei (CN); Shaopeng Wu, Hubei (CN); Yi Gu, Hubei (CN); Ying Li, Hubei (CN); Jun Xie, Hubei (CN); Xiaobin Han, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 443 days.

(21) Appl. No.: 16/255,993

(22) Filed: Jan. 24, 2019

(65) Prior Publication Data

US 2019/0300430 A1     Oct. 3, 2019

(30) Foreign Application Priority Data

Mar. 27, 2018  (CN) .......................... 201810257576.4

(51) Int. Cl.
*C04B 24/00*    (2006.01)
*B32B 5/16*     (2006.01)
(Continued)

(52) U.S. Cl.
CPC ........ *C04B 24/125* (2013.01); *C04B 20/0036* (2013.01); *C04B 20/1022* (2013.01);
(Continued)

(58) Field of Classification Search
CPC ..... C04B 24/125; C04B 24/001; C04B 22/06; Y10T 428/2982; Y10T 428/2984; Y10T 428/2985; Y10T 428/2989
(Continued)

(56) References Cited

U.S. PATENT DOCUMENTS 5,962,003 A  * 10/1999  Shukla .................... A01N 25/28
                                                          264/4.7
8,362,113 B2 *  1/2013  Xing .................... C04B 40/0039
                                                          523/206
(Continued)

OTHER PUBLICATIONS

Yang et al, Microencapsulation of Isocyanates for Self-Healing Polymers, Macromolecules 2008, 41, 9650-9655 (Year: 2008).*
(Continued)

*Primary Examiner* — Hoa (Holly) Le
(74) *Attorney, Agent, or Firm* — Tim Tingkang Xia, Esq.; Locke Lord LLP

(57) ABSTRACT

Electromagnetically-induced cement concrete crack self-healing diisocyanate microcapsules include raw materials, in parts by weight, comprising 15-55 parts of petroleum resin, 5-10 parts of paraffin, 5-10 parts of polyethylene wax, 3-10 parts of magnetic iron powder and 20-67 parts of diisocyanate. The diisocyanate microcapsules use the diisocyanate as a core material, and the petroleum resin/paraffin/polyethylene wax/magnetic iron powder mixture as the shell of the capsule. When micro cracks occur in the concrete, the crack propagation can break partial of the microcapsule inside, the diisocyanate inside the microcapsules flows out and diffuses into the crack and is subjected to a solidifying reaction with water in the concrete, so that the crack is repaired in time; and for the microcapsules that are not broken by cracks, external electromagnetic field can be applied to melt the shell to release the diisocyanate inside, thereby diffusing into cracks and solidify with water to repair them.

10 Claims, 1 Drawing Sheet

(51) Int. Cl.
  *B05D 7/00*    (2006.01)
  *C04B 24/12*   (2006.01)
  *C04B 20/10*   (2006.01)
  *H01F 1/03*    (2006.01)
  *E01C 7/14*    (2006.01)
  *C04B 20/00*   (2006.01)
  *E01C 11/00*   (2006.01)
  *C04B 103/00*  (2006.01)
  *C04B 111/34*  (2006.01)

(52) U.S. Cl.
  CPC .......... *C04B 20/1066* (2013.01); *E01C 7/147* (2013.01); *E01C 11/005* (2013.01); *H01F 1/0306* (2013.01); *C04B 2103/0077* (2013.01); *C04B 2111/343* (2013.01); *C08J 2391/06* (2013.01)

(58) Field of Classification Search
  USPC .......................... 428/402.2, 402.21, 402.24
  See application file for complete search history.

(56) References Cited

U.S. PATENT DOCUMENTS

| | | | |
|---|---|---|---|
| 8,993,066 B2* | 3/2015 | Yang | C09D 7/70 427/386 |
| 2013/0196071 A1* | 8/2013 | Yang | C08G 18/703 427/386 |
| 2016/0346753 A1* | 12/2016 | Shukla | C08G 59/188 |

OTHER PUBLICATIONS

Tittelboom & Belie, Self-Healing in Cementitious Materials—A Review, Materials 2013, 6, 2182-2217; doi:10.3390/ma6062182 (Year: 2013).*

Du et al., Preparation and Characterization of Microcrystalline Wax/Epoxy Resin Microcapsules for Self-Healing of Cementitious Materials, Materials 2021, 14, 1725. https://doi.org/10.3390/ma14071725 (Year: 2021).*

* cited by examiner

ELECTROMAGNETICALLY-INDUCED CEMENT CONCRETE CRACK SELF-HEALING DIISOCYANATE MICROCAPSULES AND THEIR PREPARATION METHOD

CROSS-REFERENCE TO RELATED APPLICATION

This application claims priority to Chinese Patent Application No. 201810257576.4, filed Mar. 27, 2018 in the State Intellectual Property Office of P.R. China, which is hereby incorporated herein in its entirety by reference.

TECHNICAL FIELD

The present invention relates generally to the field of concrete, and more particularly, a kind of electromagnetically-induced cement concrete crack self-healing diisocyanate microcapsules and their preparation method.

BACKGROUND

Cement concrete has the advantages of abundant raw materials, simple construction and formation, high compressive strength and good durability, and is widely used in the fields of industrial and civil buildings, road and bridge engineering, water conservancy and hydropower engineering, nuclear power plants, ports, etc. However, the cement concrete is a porous brittle material, and is susceptible to internal damage and cracks due to freeze-thaw cycles and other external forces during its service. After the internal damage and cracks occur in the concrete, the service life of the building structure is shortened, and the safety of the building is jeopardized.

In order to improve the service life and safety of concrete structures, more and more attention is paid to concrete with the self-healing function. Self-healing concrete is an intelligent material, and can repair the internal damage and cracks generated during the use of the concrete through the self-response mechanism inside the concrete, thereby eliminating hidden dangers and prolonging the service life of the concrete.

In order to achieve self-healing of concrete cracks, some self-healing techniques have been proposed. The existing self-healing techniques mainly include: a self-healing technique using a functional admixture to catalytically induce unhydrated cement in the concrete to react at the cracks, a technique for self-healing concrete cracks with broken hollow fibers or microcapsules containing healing agent, and a technique for self-healing cracks with calcite prepared by a reaction between microbes added to the concrete and the nutrient solution. The functional admixture technique has a good repair effect on the internal damage and microcracks of concrete, but self-healing can be carried out only in a humid environment, besides, the repair speed is low, and the repair effect on wide cracks is poor. Although the microbe technique has a certain repair effect on concrete cracks, microbes have a short survival period in highly alkaline concrete and also self-healing needs to be carried out in a humid environment, which limits the application of the microbe technique. The hollow fiber or microcapsule technique repairs the concrete cracks faster, but the hollow fiber or microcapsule is not easy to break when a crack is formed in the concrete, and the internal repair agent cannot be released and is hard to solidify. These problems severely restrict the development and application of self-healing concrete.

SUMMARY

In view of the deficiencies of the prior art, the objective of this invention is to provide a kind of electromagnetically-induced cement concrete crack self-healing diisocyanate microcapsules and their preparation method.

In one aspect, the kind of electromagnetically-induced cement concrete crack self-healing diisocyanate microcapsules is characterized in that the microcapsules are prepared using the following raw materials in parts by weight: 15-55 parts of petroleum resin, 5-10 parts of paraffin, 5-10 parts of polyethylene wax, 3-10 parts of magnetic iron powder and 20-67 parts of diisocyanate.

In one embodiment, the petroleum resin is a C5 resin or a C9 resin.

In one embodiment, the paraffin has a melting point of 50-70° C., and the polyethylene wax has a melting point of 100-110° C.

In one embodiment, the magnetic iron powder is high-purity iron powder, carbonyl iron powder or iron oxide powder, and has a fineness of 200-2000-mesh; in this field, magnetic iron oxide powders include $Fe_3O_4$ and $\gamma\text{-}Fe_3O_2$.

In one embodiment, the diisocyanate is hexamethylene diisocyanate, 1,5-naphthalene diisocyanate or isophorone diisocyanate.

A preparation method of the above electromagnetically-induced cement concrete crack self-healing diisocyanate microcapsules comprises the following steps:

(1) weighing the following raw materials in parts by weight: 15-55 parts of petroleum resin, 5-10 parts of paraffin, 5-10 parts of polyethylene wax, 3-10 parts of magnetic iron powder and 20-67 parts of diisocyanate;

(2) heating the petroleum resin to 130-140° C., adding the paraffin under stirring, mixing the paraffin and the petroleum resin uniformly, adding the polyethylene wax and stirring continuously to mix the polyethylene wax and the paraffin/petroleum resin uniformly, adding the magnetic iron powder, continuing to perform stirring to mix the magnetic iron powder and the petroleum resin/paraffin/polyethylene wax uniformly, finally adding the diisocyanate, and carrying out stirring for 2-4 h while controlling the temperature at 100-110° C.; (3) stopping heating, increasing the stirring speed, adding the perfluorotributylamine solution, and rapidly lowering the temperature of the mixture to obtain a petroleum resin/paraffin/polyethylene wax/magnetic iron powder coated diisocyanate microcapsule suspension;

(4) carrying out ultrasonic dispersion treatment on the suspension, separating out the microcapsules by filtration, and carrying out drying treatment to obtain the electromagnetically-induced cement concrete crack self-healing diisocyanate microcapsules.

In one embodiment, the stirring speed in the step (2) is 300-500 rpm, and the stirring speed in the step (3) is 1000-1200 rpm.

In one embodiment, in the step (2), the petroleum resin is heated to 130-140° C. and stirred for 20-40 min, the paraffin is added, stirring is continued to be performed for 10-20 min, the polyethylene wax is added, stirring is continued to be performed for 10-20 min, the magnetic iron powder is added, and stirring is continued to be performed for 10-20 min.

In one embodiment, the ultrasonic dispersion treatment process in the step (4) is carried out at an ultrasonic frequency of 40 kHz for 30 min.

In one embodiment, the drying treatment in the step (4) is carried out at a temperature of 40-50° C. for 24 h.

The electromagnetically-induced cement concrete crack self-healing diisocyanate microcapsules and their preparation method have the following beneficial effects:

(1) the diisocyanate microcapsule of the present invention uses the diisocyanate as the core material, and the petroleum resin/paraffin/polyethylene wax/magnetic iron powder mixture as the shell of the microcapsule; by applying the microcapsules prepared by using the diisocyanate as the core material in concrete, when cracks are generated, on the one hand, the crack tips expand to break some of the microcapsules, and diisocyanate will flow out; on the other hand, external electromagnetic field can be applied to heat and melt the shell of the microcapsules, and thus the diisocyanate inside the microcapsule flows out and diffuses into the crack to react with the moisture inside the concrete, so that the cracks in the concrete can be repaired much better; the use of the diisocyanate microcapsules of the present invention can endow the concrete with much higher crack self-healing capability and prolong the service life of the concrete;

(2) the diisocyanate microcapsule of the present invention adopts the petroleum resin/paraffin/polyethylene wax/magnetic iron powder mixture as the microcapsule shell, and the microcapsule shell can be heated and melted under the action of an external electromagnetic field, thereby effectively solving the problem that the cracks in the concrete cannot be healed since the microcapsule cannot be broken by the small stress at the crack expansion tip; the petroleum resin, paraffin and polyethylene wax are all thermoplastic materials, and the melting point of the microcapsule shell and the viscosity after melting can be controlled by changing the mixing ratio of the petroleum resin, paraffin and polyethylene wax; the addition of the magnetic iron powder to the capsule shell can allow the microcapsule to be rapidly heated under the action of the external electromagnetic field; when the temperature rises above the melting point of the capsule shell, the capsule shell will be melted, and the healing agent in the microcapsule will flow out into the concrete crack, so that the crack (including the wide crack) will be repaired;

(3) the diisocyanate microcapsule of the present invention uses the diisocyanate as the microcapsule core material, so that the crack of the concrete can be repaired without using a solidifying agent; the isocyanate group (—NCO) is highly reactive and can react immediately with water (or moisture) to form a crosslinked product, while the concrete is a porous material and contains a certain amount of water inside; after the concrete is cracked, the crack tip expansion stress or the electromagnetic field action causes the microcapsule shell to break or melt, and the diisocyanate with a small viscosity inside the microcapsule easily diffuses into the crack and reacts with water to form an expanded gel product, so that the crack can be repaired.

DETAILED DESCRIPTION

Figure 1A:
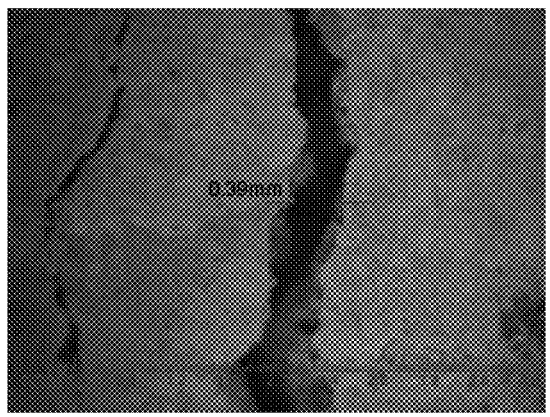
FIGS. 1A and 1B shows respectively crack changes before and after electromagnetic induction of cement concrete doped with the diisocyanate microcapsules according to Embodiment 1.

In order to better understand the present invention, the contents of the present invention will be further clarified below with reference to the embodiments, but the contents of the present invention are not limited to the following embodiments.

Embodiment 1

The electromagnetically-induced cement concrete crack self-healing diisocyanate microcapsules are prepared by the following method:

(1) weighing the following raw materials in parts by weight: 25 parts of C9 petroleum resin, 5 parts of paraffin (having a melting point of 68-70° C.), 5 parts of polyethylene wax (having a melting point of 100-103° C.), 5 parts of 2000-mesh iron oxide powder ($Fe_3O_4$) and 60 parts of hexamethylene diisocyanate;

(2) adding 25 parts of petroleum resin into a three-necked flask with a heating mantle, heating the petroleum resin to 130-140° C., and stirring it at a speed of 300-500 rpm for 30 min;

(3) adding 5 parts of paraffin into the three-necked flask, maintaining the temperature at 130-140° C., and stirring the mixture at a speed of 300-500 rpm for 15 min to mix the paraffin with the petroleum resin uniformly;

(4) adding 5 parts of polyethylene wax into the three-necked flask, maintaining the temperature at 130-140° C., and stirring the mixture at a speed of 300-500 rpm for 15 min to mix the polyethylene wax with the petroleum resin/paraffin uniformly;

(5) adding 5 parts of iron oxide powder ($Fe_3O_4$) into the three-necked flask, maintaining the temperature at 130-140° C., and stirring the mixture at a speed of 300-500 rpm for 15 min to mix the iron oxide powder with the petroleum resin/paraffin/polyethylene wax uniformly;

(6) adding 60 parts of hexamethylene diisocyanate into the three-necked flask, maintaining the temperature at 100-110° C., and stirring the mixture at a speed of 300-500 rpm for 3 h;

(7) removing the heating mantle, increasing the stirring speed to 1000-1200 rpm, adding 500 parts of perfluorotributylamine solution into the three-necked flask, and rapidly lowering the temperature of the mixture to obtain a petroleum resin/paraffin/polyethylene wax/iron oxide powder mixture coated hexamethylene diisocyanate microcapsule suspension;

(8) carrying out ultrasonic dispersion treatment on the suspension at an ultrasonic frequency of 40 kHz for 30 min, carrying out filtering, and drying the separated microcapsule in a drying oven of 50° C. for 24 h to obtain the electromagnetically-induced cement concrete crack self-healing diisocyanate microcapsules.

The average particle size and shell thickness of the microcapsules prepared in this embodiment are tested, and the encapsulation efficiency and the core/shell mass ratio of the capsule are tested and calculated. The results are shown in Table 1. The results in Table 1 show that the microcapsules prepared in this embodiment have a small average particle size, a thin shell thickness, a high encapsulation efficiency and a high core/shell mass ratio.

TABLE 1

| Microcapsules prepared in Embodiment 1 | | | |
|---|---|---|---|
| Average Particle Size (μm) | Shell Thickness (μm) | Encapsulation Efficiency (%) | Core/shell Mass Ratio |
| 100 | 1.2 | 79.41 | 1.95 |

Electromagnetic induction self-healing test of cement concrete doped with the diisocyanate microcapsules prepared in Embodiment 1:

(1) Preparation molding and curing of self-healing concrete: the microcapsules prepared above are added to concrete (the doping amount is 8% by mass of the cement) to prepare self-healing concrete; the prepared concrete is poured into a mold of 500 mm×100 mm×50 mm, vibrated and smoothed, placed for 24 hours and demolded; and the concrete specimens are transferred to a curing room for 28 days, then taken out and placed at room temperature for 7 days.

(2) Prefabrication of a crack: using a three-point bending test method (i.e., the test specimen is placed on two support points with a certain distance, and a downward load is applied to the test specimen on the midpoint of the two support points), a microcrack is generated on the surface of the test specimen, the test specimen is immediately taken down and the initial crack width is measured.

(3) Electromagnetically-induced self-healing: the electromagnetic heating equipment has a power of 7.5 kW, a voltage of 650 V, a frequency of 123 kHz and an induction heating coil size of 100 mm×200 mm, the induction heating coil is placed 2 cm above the crack on the surface of the concrete test specimen, the surface temperature of the induction heating zone of the concrete slab is tested by an infrared thermometer during the heating, and the heating is stopped when the temperature rises to 120° C.

Figure 1B:
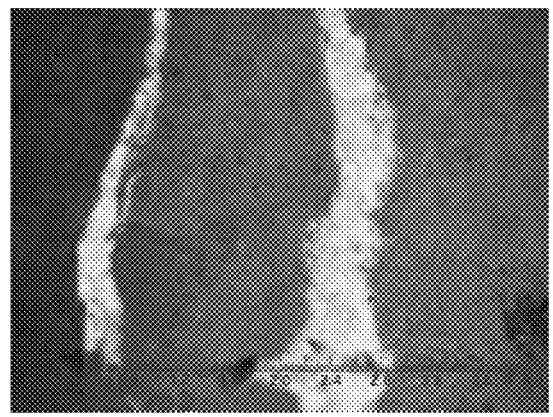
Figure 2A:
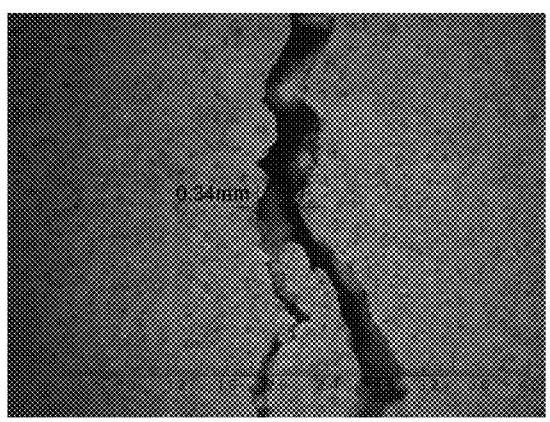
FIGS. 2A and 2B shows respectively crack changes before and after electromagnetic induction of cement concrete doped with the diisocyanate microcapsules according to Embodiment 2.
Figure 2B:
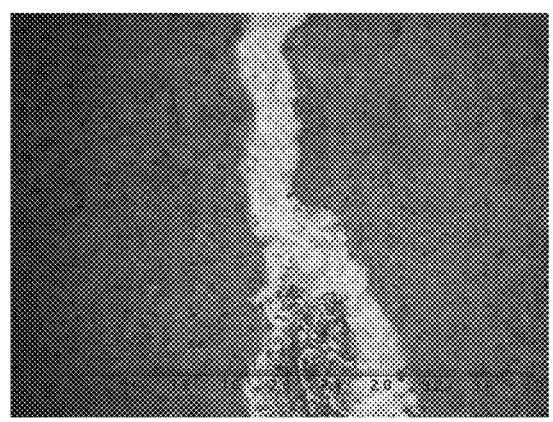

Changes of crack width: initial cracks of different widths are selected and the crack widths are separately measured at 1 h, 3 h and 5 h after electromagnetic induction. The test results are shown in Table 2. The results in Table 2 show that the electromagnetically-induced cement concrete crack self-healing diisocyanate microcapsules prepared in Embodiment 1 can rapidly repair concrete cracks of different widths, a crack of 0.16 mm can be repaired in 1 h, and a crack of 0.39 mm can be repaired in 5 h. The crack changes before and after electromagnetic induction of cement concrete doped with the diisocyanate microcapsules according to Embodiment 1 are shown in FIGS. 1A and 1B, respectively.

TABLE 2

Changes of crack width of concrete doped with the microcapsules prepared in Embodiment 1 under electromagnetic induction action

| Initial crack before electromagnetic induction | Crack width tested at different times after electromagnetic induction | | |
|---|---|---|---|
| | 1 h | 3 h | 5 h |
| 0.16 mm | 0.00 mm | 0.00 mm | 0.00 mm |
| 0.25 mm | 0.11 mm | 0.00 mm | 0.00 mm |
| 0.39 mm | 0.26 mm | 0.11 mm | 0.00 mm |

Embodiment 2

The electromagnetically-induced cement concrete crack self-healing diisocyanate microcapsules are prepared using the following raw materials in parts by weight: 31 parts of C5 petroleum resin, 6.5 parts of paraffin (with a melting point of 64-66° C.), 6 parts of polyethylene wax (with a melting point of 106-110° C.), 3.5 parts of 1500-mesh carbonyl iron powder and 53 parts of 1,5-naphthene diisocyanate. The preparation method is the same as that in Embodiment 1.

The average particle size and shell thickness of the microcapsules prepared in this embodiment are tested, and the encapsulation efficiency and the core/shell mass ratio are tested and calculated. The results are shown in Table 3 Similar to Embodiment 1, the microcapsules prepared in this embodiment have a small average particle size, a thin shell thickness, a high encapsulation efficiency and a high core/shell mass ratio.

TABLE 3

| Microcapsule prepared in Embodiment 2 | | | |
|---|---|---|---|
| Average Particle Size (μm) | Shell Thickness (μm) | Encapsulation Efficiency (%) | Core/Shell Mass Ratio |
| 120 | 1.45 | 75.28 | 1.84 |

Electromagnetic induction self-healing of cement concrete doped with the diisocyanate microcapsules prepared in Embodiment 2:

(1) the microcapsules prepared above are added to concrete (the doping amount is 10% by mass of the cement) to prepare self-healing concrete; the preparation molding and curing of the self-healing concrete and the prefabrication of the crack are the same as those in Embodiment 1;

(2) electromagnetically-induced self-healing: the electromagnetically-induced self-healing process is the same as that in Embodiment 1, and the surface temperature of the concrete specimen in the induction heating zone is controlled at 130° C.

Initial cracks of different widths are selected and the crack widths are separately measured at 1 h, 3 h and 5 h after electromagnetic induction. The test results are shown in Table 4. The results in Table 4 show that the electromagnetically-induced cement concrete crack self-healing diisocyanate microcapsules prepared in Embodiment 2 can rapidly repair concrete cracks of different widths, and the crack of 0.34 mm is basically repaired within 3 h. The crack changes before and after electromagnetic induction of cement concrete doped with the diisocyanate microcapsules according to Embodiment 2 are shown in FIGS. 1A and 1B, respectively.

TABLE 4

Changes of crack width of concrete doped with the microcapsules prepared in Embodiment 2 under electromagnetic induction action

| Initial crack before electromagnetic induction | Crack width tested at different times after electromagnetic induction | | |
|---|---|---|---|
| | 1 h | 3 h | 5 h |
| 0.12 mm | 0.00 mm | 0.00 mm | 0.00 mm |
| 0.24 mm | 0.12 mm | 0.00 mm | 0.00 mm |
| 0.34 mm | 0.19 mm | 0.05 mm | 0.00 mm |

Embodiment 3

The electromagnetically-induced cement concrete crack self-healing diisocyanate microcapsules are prepared from the following raw materials in parts by weight: 42 parts of C9 petroleum resin, 8 parts of paraffin (with a melting point of 64-66° C.), 8 parts of polyethylene wax (with a melting point of 103-106° C.), 8 parts of 200-mesh high-purity iron powder and 34 parts of isophorone diisocyanate. The preparation method is the same as that in Embodiment 1.

The average particle size and shell thickness of the microcapsules prepared in this embodiment are tested, and the encapsulation efficiency and the core/shell mass ratio are tested and calculated. The results are shown in Table 5 Similar to Embodiment 1, the microcapsules prepared in this embodiment have a small average particle size, a thin shell thickness, a high encapsulation efficiency and a high core/shell mass ratio.

TABLE 5

| Microcapsules prepared in Embodiment 3 | | | |
|---|---|---|---|
| Average Particle Size (μm) | Shell Thickness (μm) | Encapsulation Efficiency (%) | Core/Shell Mass Ratio |
| 150 | 1.82 | 70.41 | 1.72 |

Electromagnetic induction self-healing test of cement concrete doped with the diisocyanate microcapsules prepared in Embodiment 3:

(1) the microcapsules prepared in this embodiment are added to concrete (the doping amount is 10% by mass of the cement) to prepare self-healing concrete; the preparation molding and curing of the self-healing concrete and the prefabrication of the crack are the same as those in Embodiment 1;

(2) electromagnetically-induced self-healing: the electromagnetically-induced self-healing process is the same as that in Embodiment 1, and the surface temperature of the concrete specimen in the induction heating zone is controlled at 140° C.

Initial cracks of different widths are selected and the crack widths are separately measured at 1 h, 3 h and 5 h after electromagnetic induction. The test results are shown in Table 6. The results in Table 6 show that the electromagnetically-induced cement concrete crack self-healing diisocyanate microcapsules prepared in Embodiment 3 can rapidly repair concrete cracks of different widths, and the crack of 0.32 mm can be repaired within 5 h.

TABLE 6

| Changes of crack width of concrete doped with the microcapsules prepared in Embodiment 3 under electromagnetic induction action | | | |
|---|---|---|---|
| Initial crack before electromagnetic induction | Crack width tested at different times after electromagnetic induction | | |
| | 1 h | 3 h | 5 h |
| 0.13 mm | 0.00 mm | 0.00 mm | 0.00 mm |
| 0.22 mm | 0.12 mm | 0.00 mm | 0.00 mm |
| 0.32 mm | 0.21 mm | 0.11 mm | 0.00 mm |

Embodiment 4

The electromagnetically-induced cement concrete crack self-healing diisocyanate microcapsules are prepared from the following raw materials in parts by weight: 50 parts of C9 petroleum resin, 10 parts of paraffin (with a melting point of 78-80° C.), 10 parts of polyethylene wax (with a melting point of 103-106° C.), 10 parts of 500-mesh high-purity iron powder and 20 parts of hexamethylene diisocyanate. The preparation method is the same as that in Embodiment 1.

The microcapsules prepared in this embodiment are added to concrete (the doping amount is 8% by mass of the cement) to prepare electromagnetically-induced self-healing concrete.

Embodiment 5

The electromagnetically-induced cement concrete crack self-healing diisocyanate microcapsules are prepared from the following raw materials in parts by weight: 21 parts of C5 petroleum resin, 6 parts of paraffin (with a melting point of 50-52° C.), 8 parts of polyethylene wax (with a melting point of 100-103° C.), 5 parts of 2000-mesh iron oxide powder ($\gamma$-$Fe_2O_3$) and 60 parts of hexamethylene diisocyanate. The preparation method is the same as that in Embodiment 1.

The microcapsules prepared in this embodiment are added to concrete (the doping amount is 12% by mass of the cement) to prepare electromagnetically-induced self-healing concrete.

It is apparent that the above-described embodiments are merely examples for clear description, and are not intended to limit the implementations. Other variations or variations of the various forms may be made by those skilled in the art on the basis of the above description. There is no need and no way to exhaust all of the implementations. Obvious changes or variations resulting therefrom are still within the scope of protection of the present invention.

What is claimed is:

1. Electromagnetically-induced cement concrete crack self-healing diisocyanate microcapsules, comprising:
   raw materials, in parts by weight, comprising 15-55 parts of petroleum resin, 5-10 parts of paraffin, 5-10 parts of polyethylene wax, 3-10 parts of magnetic iron powder and 20-67 parts of diisocyanate, wherein the paraffin has a melting point of 50-70° C.

2. The electromagnetically-induced cement concrete crack self-healing diisocyanate microcapsules according to claim 1, wherein the petroleum resin is a C5 resin or a C9 resin.

3. The electromagnetically-induced cement concrete crack self-healing diisocyanate microcapsules according to claim 1, wherein the polyethylene wax has a melting point of 100-110° C.

4. The electromagnetically-induced cement concrete crack self-healing diisocyanate microcapsules according to claim 1, wherein the magnetic iron powder is pure iron powder, carbonyl iron powder or iron oxide powder, and has a fineness of 200-2000-mesh.

5. The electromagnetically-induced cement concrete crack self-healing diisocyanate microcapsules according to claim 1, wherein the diisocyanate is hexamethylene diisocyanate, 1,5-naphthalene diisocyanate or isophorone diisocyanate.

6. A preparation method of electromagnetically-induced cement concrete crack self-healing diisocyanate microcapsules, comprising the steps of:
   (a) providing raw materials, in parts by weight, comprising 15-55 parts of petroleum resin, 5-10 parts of paraffin, 5-10 parts of polyethylene wax, 3-10 parts of magnetic iron powder and 20-67 parts of diisocyanate, wherein the paraffin has a melting point of 50-70° C.;
   (b) heating the petroleum resin to 130-140° C., adding the paraffin under stirring, mixing the paraffin and the petroleum resin uniformly, adding the polyethylene wax and stirring continuously to mix the polyethylene wax and the paraffin/petroleum resin uniformly, adding the magnetic iron powder, continuing to perform stirring to mix the magnetic iron powder and the petroleum resin/paraffin/polyethylene wax uniformly, finally adding the diisocyanate, and carrying out stirring for 2-4 h while controlling the temperature at 100-110° C.;

(c) stopping heating, increasing the stirring speed, adding the perfluorotributylamine solution, and lowering the temperature of the mixture to obtain a petroleum resin/paraffin/polyethylene wax/magnetic iron powder coated diisocyanate microcapsule suspension; and (d) carrying out ultrasonic dispersion treatment on the suspension, separating out the microcapsules by filtration, and carrying out drying treatment to obtain the electromagnetically-induced cement concrete crack self-healing diisocyanate microcapsules.

7. The preparation method according to claim 6, wherein the stirring speed in the step (b) is 300-500 rpm, and the stirring speed in the step (c) is 1000-1200 rpm.

8. The preparation method according to claim 6, wherein in the step (b), the petroleum resin is heated to 130-140° C. and stirred for 20-40 min, the paraffin is added, stirring is continued to be performed for 10-20 min, the polyethylene wax is added, stirring is continued to be performed for 10-20 min, the magnetic iron powder is added, and stirring is continued to be performed for 10-20 min.

9. The preparation method according to claim 6, wherein the ultrasonic dispersion treatment process in the step (d) is carried out at an ultrasonic frequency of 40 kHz for 30 min.

10. The preparation method according to claim 6, wherein the drying treatment in the step (d) is carried out at a temperature of 40-50° C. for 24 h.

* * * * *